US011924926B2

(12) United States Patent
Agarwal et al.

(10) Patent No.: US 11,924,926 B2
(45) **Date of Patent: *Mar. 5, 2024**

(54) 4G/5G CORE INTERWORKING

(71) Applicant: Parallel Wireless, Inc., Nashua, NH (US)

(72) Inventors: Kaitki Agarwal, Westford, MA (US); Amit Miron, Tsur Yitzak (IL); Fernando Cerioni, Lancaster, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,564

(22) Filed: Aug. 23, 2022

(65) Prior Publication Data

US 2022/0408524 A1 Dec. 22, 2022

Related U.S. Application Data

(63) Continuation of application No. 17/022,077, filed on Sep. 15, 2020, now Pat. No. 11,425,790.

(60) Provisional application No. 62/900,647, filed on Sep. 15, 2019.

(51) Int. Cl.
*H04W 88/16* (2009.01)
*H04W 36/00* (2009.01)
*H04W 92/02* (2009.01)

(52) U.S. Cl.
CPC ....... *H04W 88/16* (2013.01); *H04W 36/0066* (2013.01); *H04W 92/02* (2013.01)

(58) Field of Classification Search
CPC . H04W 36/00; H04W 36/0066; H04W 88/16; H04W 92/02
See application file for complete search history.

(56) References Cited

U.S. PATENT DOCUMENTS

| | | | | |
|---|---|---|---|---|
| 11,425,790 | B2 * | 8/2022 | Agarwal | H04W 36/0066 |
| 2016/0219570 | A1 * | 7/2016 | Guo | H04W 72/046 |
| 2018/0139670 | A1 * | 5/2018 | Shaw | H04W 36/08 |
| 2018/0220339 | A1 * | 8/2018 | Arora | H04W 36/0022 |
| 2019/0124561 | A1 * | 4/2019 | Faccin | H04W 36/0066 |
| 2019/0320358 | A1 * | 10/2019 | Knapp | H04W 52/0241 |

* cited by examiner

*Primary Examiner* — Jinsong Hu
*Assistant Examiner* — Farideh Madani
(74) *Attorney, Agent, or Firm* — Michael Y. Saji

(57) ABSTRACT

Systems, methods and computer software are disclosed for 4G and 5G core interworking. In one embodiment a HetNet gateway (HNG) is disclosed. The HNG includes a virtual 4G core; a virtual 5G core; an interface to a core network; an interface to a 4G Radio Access Network (RAN); and an interface to a 5G RAN. The HNG provides interworking 4G to 5G such that a 5G RAN works with a 4G core.

17 Claims, 10 Drawing Sheets

500
4G Core
501
HNG
501a
4G Core
501b
5G Core
VF
VF
VF: Virtualizing function
502
4G RAN
(< Rel. 15)
503
5G RAN
504

4G/5G CORE INTERWORKING

CROSS-REFERENCE TO RELATED APPLICATIONS

This application is a continuation of U.S. application Ser. No. 17/022,077, filed Sep. 15, 2020, which claims priority under 35 U.S.C. § 119(e) to U.S. Provisional Pat. App. No. 62/900,647, filed Sep. 15, 2019, titled "4G/5G Core Interworking", each of which is hereby incorporated by reference in its entirety for all purposes. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20180242396A1 (PWS-72501US02); US20150098387A1 (PWS-71731US01); US20170055186A1 (PWS-71815US01); US20170273134A1 (PWS-71850US01); US20170272330A1 (PWS-71850US02); and Ser. No. 15/713,584 (PWS-71850US03). This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND 5G is the next generation Mobile Communication technology following the 4G/LTE. 3GPP has been working on defining the standards for 5G as part of 3GPP Rel 15 and 16. Starting 1G and then followed by 2G, 3G and 4G, each generation has the laid the foundation for the next generation in order to cater to newer use cases and verticals. 4G was the first generation that introduced flat architecture with all-IP architecture. 4G enabled and flourished several new applications and use case. 5G is going to be not just about higher data rates but about total user experience and is going to cater to several new enterprise use cases like Industrial automation, Connected Cars, Massive IOT and others. This will help operators to go after new revenue opportunities.

Launching 5G network will need significant investment as it will need RAN and Packet Core upgrade. 3GPP has defined a new 5G NR and new 5G Core. Eventually all the operators will want to head towards a complete 5G network coverage with the new 5G Standalone Core, given the several new features and capabilities that the new 5G Standalone network brings in. But given the significant cost involved, 3GPP has defined number of different intermediate solutions that can provide gradual migration from current 4G network to the eventual native 5G network.

SUMMARY

3GPP has proposed multiple options to enable operators to launch 5G in a graceful manner. One option is referred to as Non-Stand Alone (NSA) while another option is referred to a Stand Alone (SA).

In one embodiment a system for providing a 5G mobile network is described. The system includes a 4G base station, a 5G base station, a virtualization server (the virtualization server further comprising a virtual 4G core, a virtual 5G core, and an Interworking Function (IWF) in communication with the 4G and 5G base stations and with the virtual 4G and 5G cores), and either a 4G core (an Evolved Packet Core (EPC)) or a 5G core (NGC) in communication with the virtualization server. The IWF may function as an Access and Mobility Management Function (AMF) to the 5G SA base station and functions as a Mobility Management Entity (MME) towards the EPC.

In another embodiment, a method for 4G and 5G core interworking is described. The method includes providing a HetNet gateway (HNG), the HNG comprising: a virtual 4G core; a virtual 5G core; an interface to a core network; an interface to a 4G Radio Access Network (RAN); and an interface to a 5G RAN. The method further includes interworking, by the HNG, 4G to 5G such that a 5G RAN works with a 4G core.

In another embodiment, a non-transitory computer-readable medium containing instructions for 4G and 5G core interworking is described, The computer readable medium includes instructions which, when executed, cause a HetNet Gateway (HNG) perform steps including providing a virtual 4G core, a virtual 5G core, an interface to a core network, an interface to a 4G Radio Access Network (RAN), and an interface to a 5G RAN; and providing interworking 4G to 5G such that a 5G RAN works with a 4G core.

DETAILED DESCRIPTION

Figure 1:
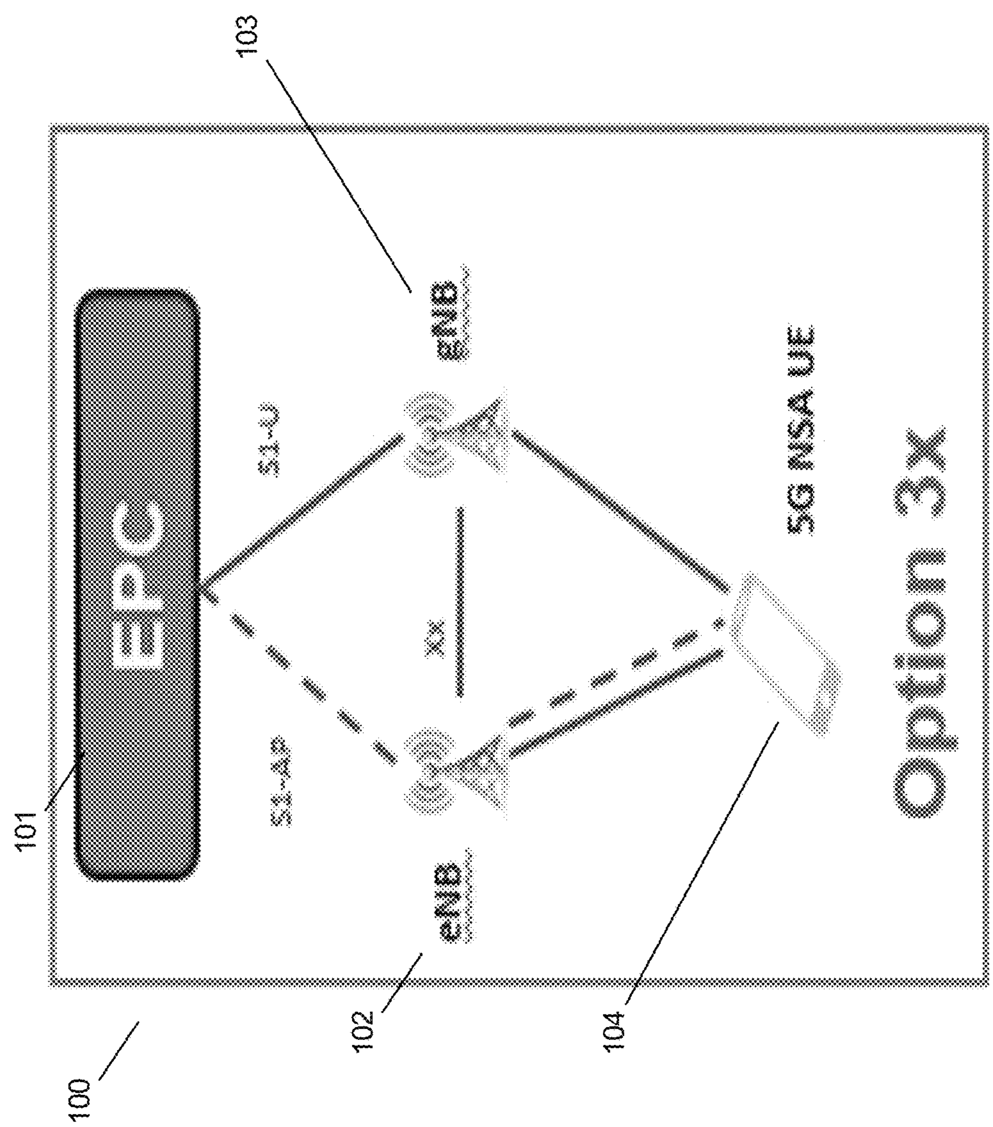
FIG. 1 is a diagram showing a 5G Non-Standalone (NSA) network.

FIG. 1 shows a prior art 5G Non-Standalone (NSA) solution 100. This solution includes an EPC 101 in communication with an eNB 102 and a gNB 103. The eNB102 and the gNB 103 are in communication with each other. Also shown is a 5G NSA UE device 104 in communication with the eNB and the gNB. This solution allows operators to launch 5G service by anchoring 5G gNodeB to the existing EPC packet core. Thus, it helps operators to launch 5G service with minimal disruption to the existing packet core and leverage their existing investment in the current 4G network for 5G as well. 5G NSA needs 5G NSA compatible 5G devices which use 4G NAS to communicate with EPC Packet Core.

Figure 2:
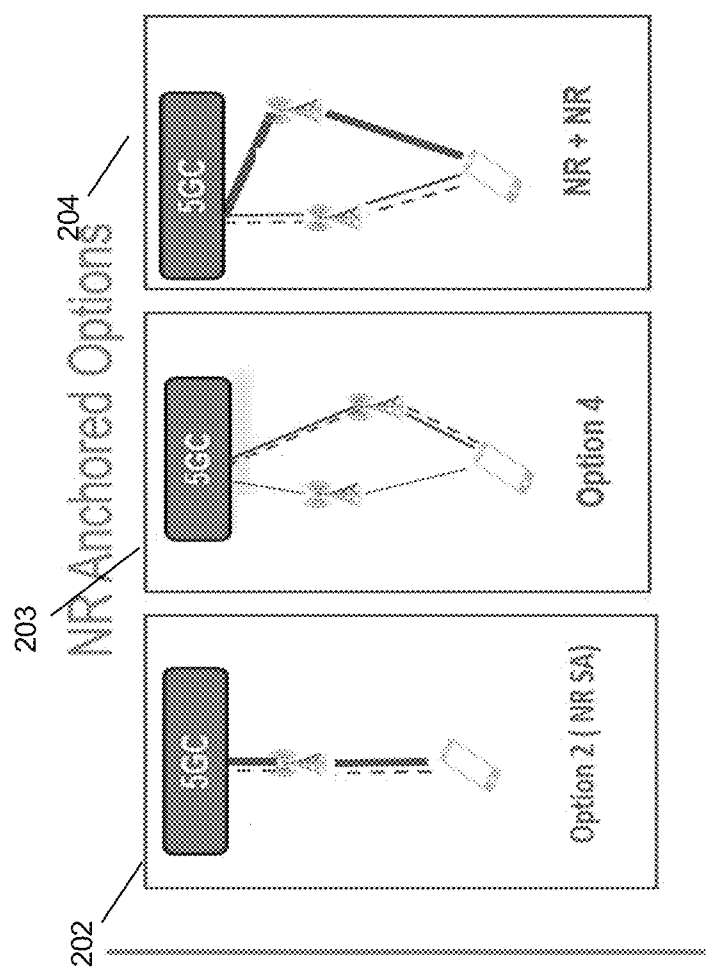
FIG. 2 is a diagram showing a 5G Standalone (SA) network.
Figure 2:
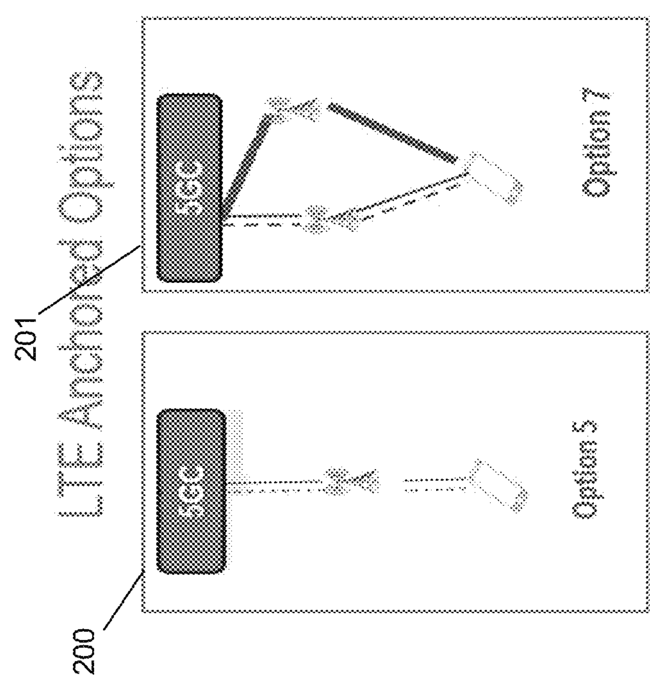

FIG. 2 shows different 5G Standalone (SA) solutions. Solution 200 is referred to as Option 5, solution 201 is referred to as Option 7, solution 202 is referred to as Option 2 (NR SA), solution 203 is referred to as Option 4, and solution 204 is referred to as NR+NR. This solution introduces a new 5G Standalone core altogether and is an altogether new network, thus the cost/investment will be very high. 5G SA needs 5G SA compatible 5G devices which use new 5G Network Adapters (NAs) to communicate with new 5G Packet Core.

Figure 3:
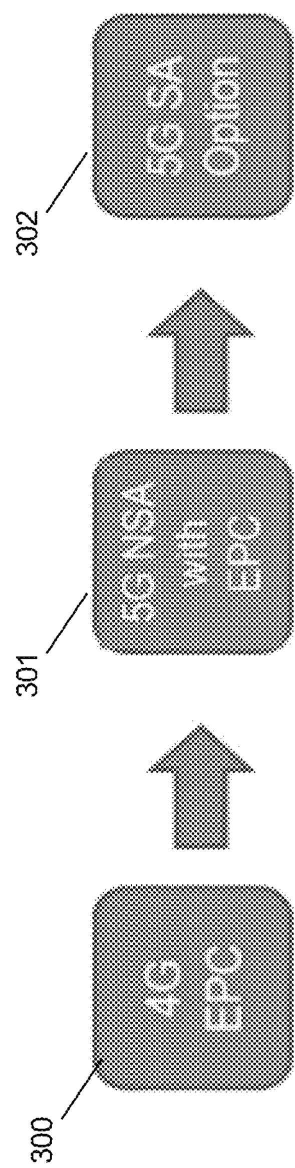
FIG. 3 is a diagram showing a migration path from 4G to 5G.

Based on this migration path normally taken by operators is as follows:

FIG. 3 shows the migration path which begins with the 4G EPC 300, then 5G NSA with EPC 301 then 5G SA option 302.

Most Operators will initially launch 5G with 5G NSA in order to leverage their existing investment and launch 5G with minimal disruption to current network. After that introduce 5G SA via option 2 or option 4/7.

Figure 4:
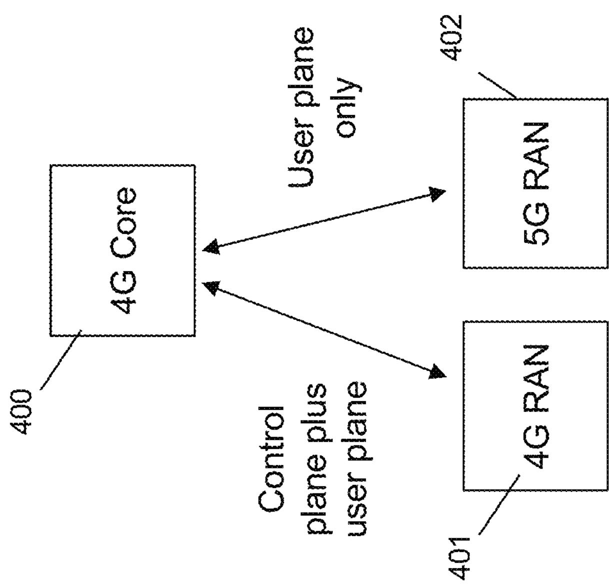
FIG. 4 is a system diagram of a 4G core with a 4G RAN and a 5G RAN, in accordance with some embodiments.

Regarding FIG. 4, and specifically 5G NSA with EPC 301, in the 4GC deployment option shown in FIG. 4, no link is required between the 4G radio 401 and 5G radio 402 with the 4G core 400. Dual connectivity is not required. Instead, a 5G RAN 402 is coupled to 4GC 400. This is another NSA deployment option.

Figure 5:
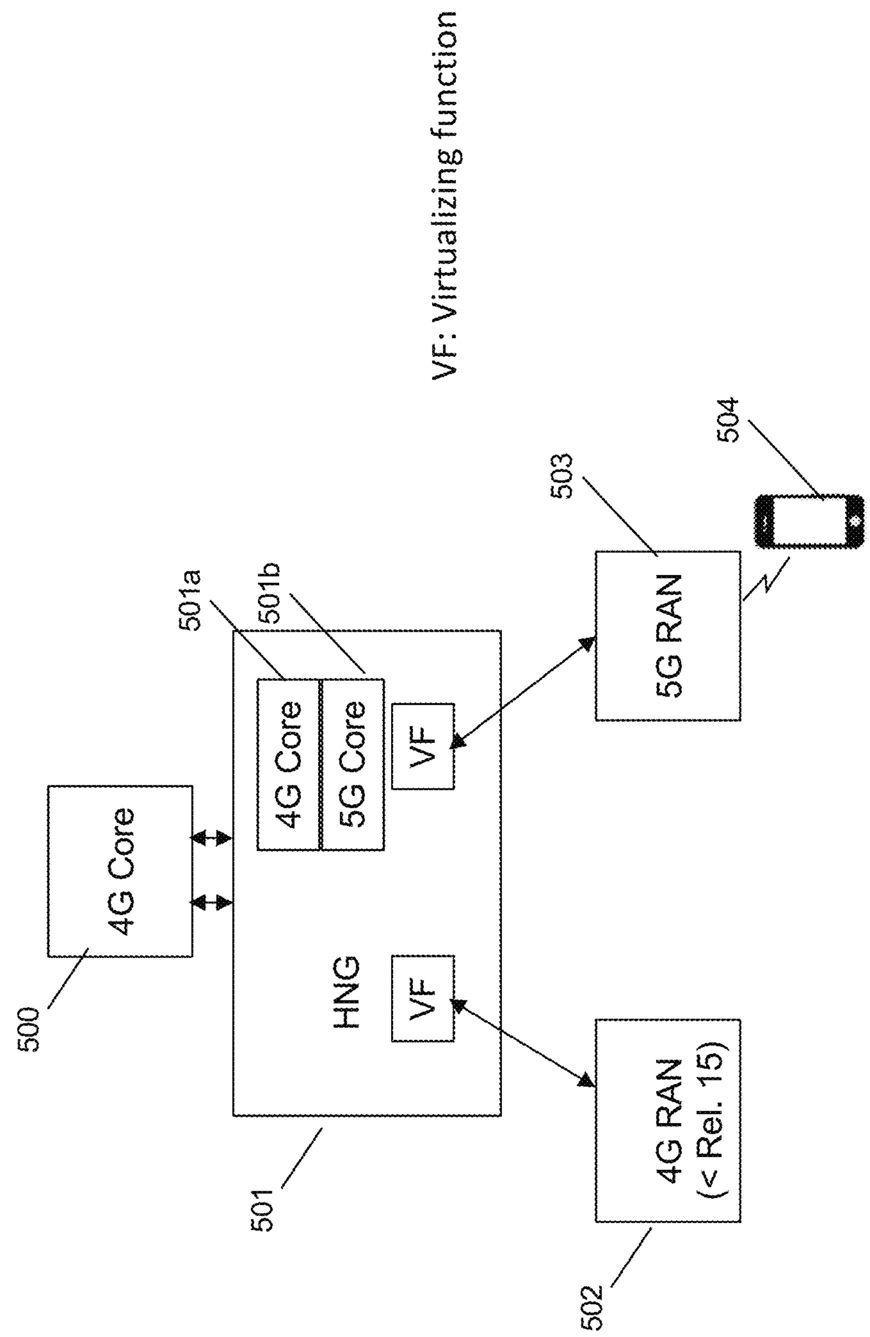
FIG. 5 is a system diagram showing an HNG between the 4G core and a 4G RAN and a 5G RAN, in accordance with some embodiments.

FIG. 5 is a system diagram showing an HNG between the 4G core and a 4G RAN and a 5G RAN, in accordance with some embodiments.

As shown in FIG. 5, a 4G RAN 502 (base station) and a 5G RAN 503 (base station) can both be coupled to a virtualization server (HNG) 501, and the HNG can be coupled to the 4G core 500. The HNG includes a virtual 4G core 501*a* and a virtual 5G core 501*b*. The HNG is in communication with a 4G RAN 502 and a 5G RAN 503 by way of respective virtualizing functions (VFs). A UE 504 is shown in communication with the 5G RAN. The HNG can interwork 4G to 5G such that a 5G RAN can work with the 4G core as needed, to support a standard 5G UE without a 5G standalone core, and can be switched over to a full 5G core later.

From the UE's perspective, a 5G standalone core is provided. This is because a virtual 5G core is created at the HNG. The HNG includes interworking between the 4G and 5G virtual cores at the HNG. For example, QCI is interworked to its equivalent 5G parameter, etc.

A single underlying data store at the HNG supports both the 4G and 5G virtual cores (and thus the 4G and 5G RANs). The single data store facilitates interworking, and the single data store can emit data that is used either in 4G or 5G signaling as identified by the interworking at the HNG.

Figure 6:
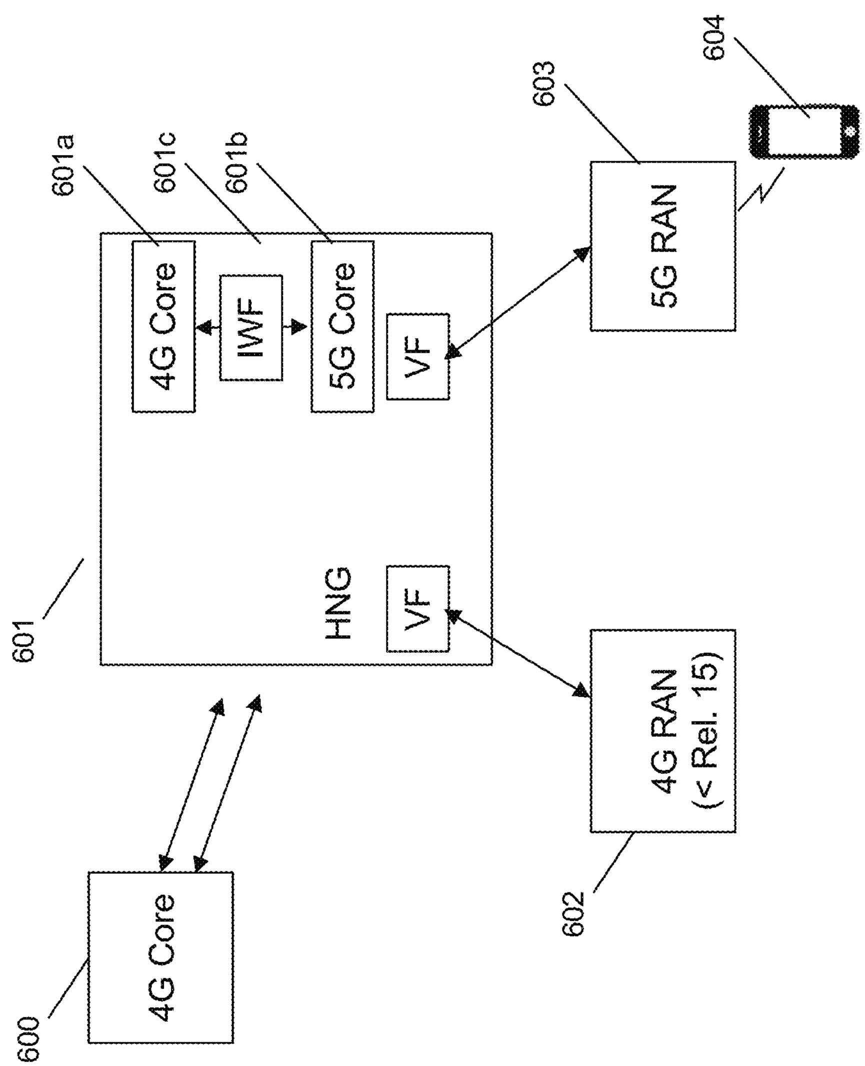
FIG. 6 is a system diagram showing an HNG between the 4G core and a 4G RAN and a 5G RAN, in accordance with some embodiments.

FIG. 6 shows an HNG 601 including a virtual 4G core 601*a* and a virtual 5G core 601*b* communicating by way of an Inter Working Function (IWF) 601*c*. The HNG is in communication with a 4G core 600. The HNG is also in communication with 4G RAN 602. Also shown is a 5G RAN 603 with a UE 604. The IWF manages communications between the 4GC 601*a* and 5GC 601*b*. The IWF enables the UE 604 to couple to 5G RAN 603 and virtual 5G core 601*b*, but enables the UE to be managed by 4GC 600 via virtual 4GC 601*a*. The IWF interworks all communications between 601*b* and 601*a*. Regarding the role of 4GC 601*a* and 4GC 600, 4GC 600 is a standard EPC and 4GC 601*a* is a virtualizing core that enables multiple base stations (4G or 5G) to be virtualized toward 4GC 600 at the HNG 601.

Figure 7:
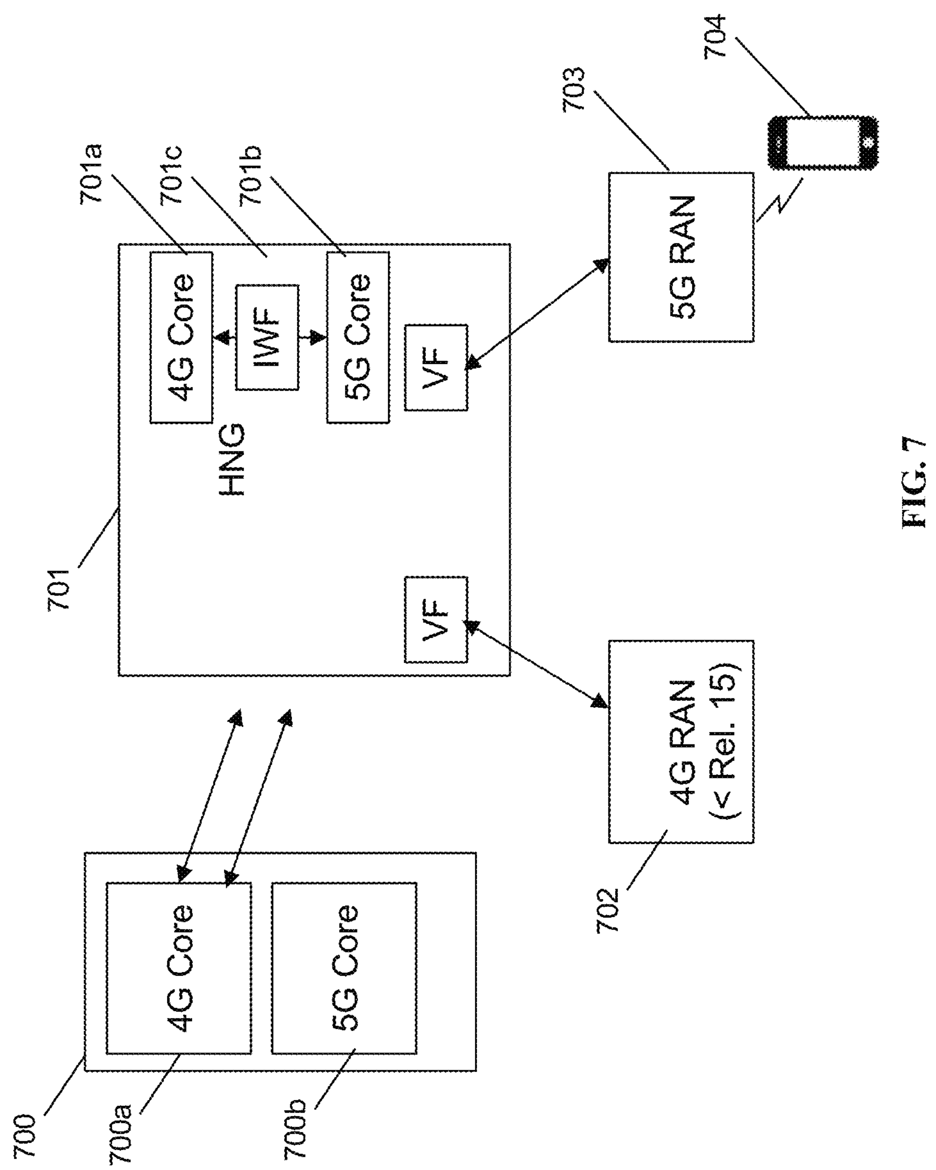
FIG. 7 is a system diagram showing an HNG between the 4G core with a 5G core and a 4G RAN and a 5G RAN, in accordance with some embodiments.

FIG. 7 shows an HNG 701 including a virtual 4G core 701*a* and also a virtual 5G core 701*b* communicating by way of an Inter Working Function (IWF) 701*c*. The HNG is in communication with a core 700 including a 4G core 700*a* and a 5G core 700*b*. The HNG is also in communication with 4G RAN 702. Also shown is a 5G RAN 703 with a UE 704. The HNG facilitates either a 4G RAN coupled with the 4G core 700*a*, the 5G ran 703 coupled with 5G core 700*b*, the 4G RAN coupled with the 5G core, the 5G RAN coupled with the 4G Core, both 4G and 5G RANs coupled with the 5G core, both the 4G and 5G RANs coupled with the 4G core, etc. The IWF enables this by interworking various signaling to and from 4G and 5G, to enable a deployment as desired by the operator.

The embodiments shown in FIGS. 5-7 are not the same as dual connectivity because they work with regular 4G RANs, without the need to upgrade to 3GPP Rel. 15 and above on the 4G RAN to support dual connectivity. Works in both greenfield networks (where 5G RANs may be deployed without concern for 4G RANs already in place) and networks where 4G RANs are already deployed. In some embodiments, this may support dual connectivity (DC) in the case that the 4G RAN is upgraded to support it. This solution also doesn't require the 4G core to be upgraded.

The 4G and 5G RANs may communicate. This may be via X2, or Xx or Xn, or equivalent, if supported by the two base stations. Of course, if direct communication is not supported between the 4G and 5G RANs, the HNG can proxy and/or broker these communications as it provides X2 brokering functionality (see US20180242396A1 Mishra et al, hereby incorporated by reference in its entirety).

The UE can be always anchored at the single 4G core, in some embodiments. This solution still supports inter-core handovers to and from 4G and 5G core, 4G inter-eNB and intra-RAT handover, handovers between 4G radio (virtualized/managed by HNG) and 4G radio (managed by itself, i.e., macro base station). In the case that the handover is between a 4G radio and a 4G radio, the UE doesn't need to do anything special, of course. In the case the handover is between a 4G radio and a 5G radio or vice versa, the UE is aware that it is an inter-RAT handover but all signaling is interworked by the IWF at the HNG.

In some embodiments, inter-RAT handovers can benefit from "sideband" information channels between the 4G and 5G cores. There are two solutions herein. Firstly, a module can be created between the HNG and the 4G core to translate the inter-RAT handover to an intra-RAT handover.

Secondly, a "phantom" 5G core network can be created to send information to the 5G-aware 4G EPC.

Figure 8:
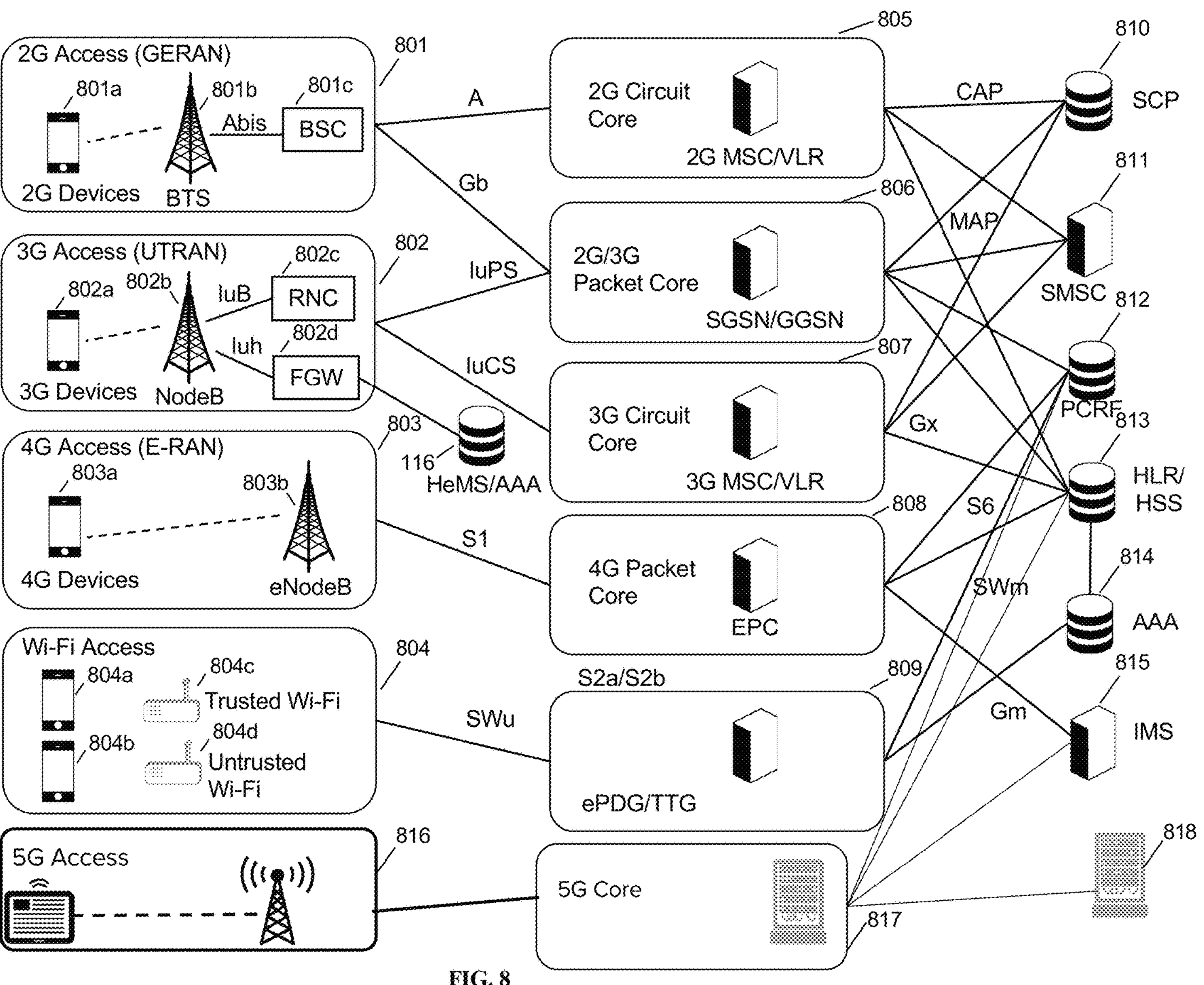
FIG. 8 is a schematic network architecture diagram for various radio access technology core networks.

FIG. 8 is a schematic network architecture diagram for 3G and other-G prior art networks. The diagram shows a plurality of "Gs," including 2G, 3G, 4G, 5G and Wi-Fi. 2G is represented by GERAN 101, which includes a 2G device 801*a*, BTS 801*b*, and BSC 801*c*. 3G is represented by UTRAN 802, which includes a 3G UE 802*a*, nodeB 802*b*, RNC 802*c*, and femto gateway (FGW, which in 3GPP namespace is also known as a Home nodeB Gateway or HNBGW) 802*d*. 4G is represented by EUTRAN or E-RAN 803, which includes an LTE UE 803*a* and LTE eNodeB 803*b*. Wi-Fi is represented by Wi-Fi access network 804, which includes a trusted Wi-Fi access point 804*c* and an untrusted Wi-Fi access point 804*d*. The Wi-Fi devices 804*a* and 804*b* may access either AP 804*c* or 804*d*. In the current network architecture, each "G" has a core network. 2G circuit core network 805 includes a 2G MSC/VLR; 2G/3G packet core network 806 includes an SGSN/GGSN (for EDGE or UMTS packet traffic); 3G circuit core 807 includes a 3G MSC/VLR; 4G circuit core 808 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 830, the SMSC 831, PCRF 832, HLR/HSS 833, Authentication, Authorization, and Accounting server (AAA) 834, and IP Multimedia Subsystem (IMS) 835. An HeMS/AAA 836 is present in some cases for use by the 3G UTRAN. The diagram is used to indicate schematically the basic functions of each network as known to one of skill in the art, and is not intended to be exhaustive. For example, 5G core 817 is shown using a single interface to 5G access 816, although in some cases 5G access can be supported using dual connectivity or via a non-standalone deployment architecture.

Noteworthy is that the RANs 801, 802, 803, 804 and 836 rely on specialized core networks 805, 806, 807, 808, 809, 837 but share essential management databases 830, 831, 832, 833, 834, 835, 838. More specifically, for the 2G GERAN, a BSC 801*c* is required for Abis compatibility with BTS 801*b*, while for the 3G UTRAN, an RNC 802*c* is required for Iub compatibility and an FGW 802*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 9:
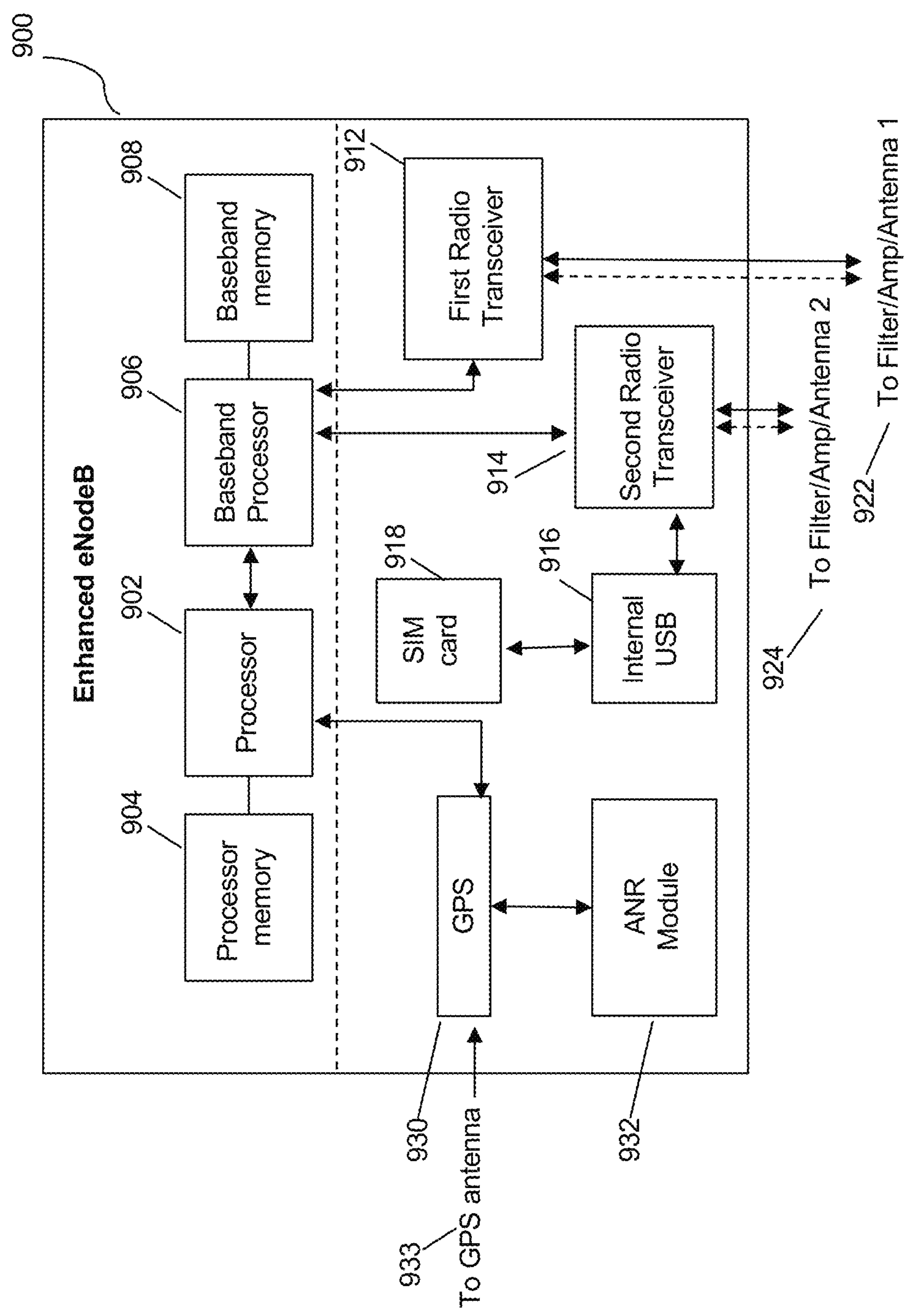
FIG. 9 is an enhanced eNodeB for performing the methods described herein, in accordance with some embodiments.

FIG. 9 shows an enhanced eNodeB for performing the methods described herein, in accordance with some embodiments. eNodeB 900 may include processor 902, processor memory 904 in communication with the processor, baseband processor 906, and baseband processor memory 908 in communication with the baseband processor. Mesh network node 900 may also include first radio transceiver 912 and second radio transceiver 914, internal universal serial bus (USB) port 916, and subscriber information module card (SIM card) 918 coupled to USB port 916. In some embodiments, the second radio transceiver 914 itself may be coupled to USB port 916, and communications from the baseband processor may be passed through USB port 916. The second radio transceiver may be used for wirelessly backhauling eNodeB 900.

Processor 902 and baseband processor 906 are in communication with one another. Processor 902 may perform routing functions, and may determine if/when a switch in network configuration is needed. Baseband processor 906 may generate and receive radio signals for both radio transceivers 912 and 914, based on instructions from processor 902. In some embodiments, processors 902 and 906 may be on the same physical logic board. In other embodiments, they may be on separate logic boards.

Processor 902 may identify the appropriate network configuration, and may perform routing of packets from one network interface to another accordingly. Processor 902 may use memory 904, in particular to store a routing table to be used for routing packets. Baseband processor 906 may perform operations to generate the radio frequency signals for transmission or retransmission by both transceivers 910 and 912. Baseband processor 906 may also perform operations to decode signals received by transceivers 912 and 914. Baseband processor 906 may use memory 908 to perform these tasks.

The first radio transceiver 912 may be a radio transceiver capable of providing LTE eNodeB functionality, and may be capable of higher power and multi-channel OFDMA. The second radio transceiver 914 may be a radio transceiver capable of providing LTE UE functionality. Both transceivers 912 and 914 may be capable of receiving and transmitting on one or more LTE bands. In some embodiments, either or both of transceivers 912 and 914 may be capable of providing both LTE eNodeB and LTE UE functionality. Transceiver 912 may be coupled to processor 902 via a Peripheral Component Interconnect-Express (PCI-E) bus, and/or via a daughtercard. As transceiver 914 is for providing LTE UE functionality, in effect emulating a user equipment, it may be connected via the same or different PCI-E bus, or by a USB bus, and may also be coupled to SIM card 918. First transceiver 912 may be coupled to first radio frequency (RF) chain (filter, amplifier, antenna) 922, and second transceiver 914 may be coupled to second RF chain (filter, amplifier, antenna) 924.

SIM card 918 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 900 is not an ordinary UE but instead is a special UE for providing backhaul to device 900.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 912 and 914, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 902 for reconfiguration.

A GPS module 930 may also be included, and may be in communication with a GPS antenna 932 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 932 may also be present and may run on processor 902 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 10:
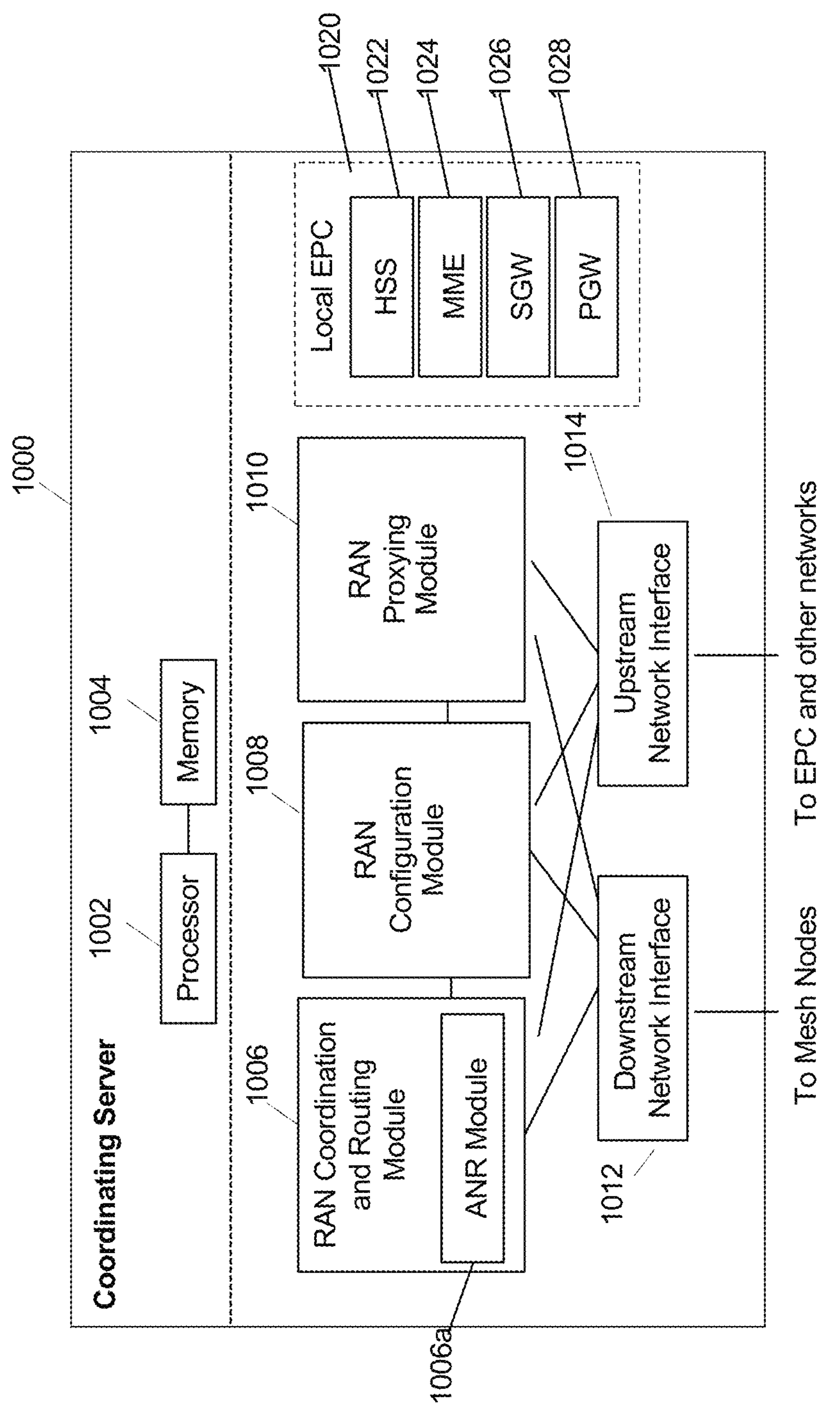
FIG. 10 is a coordinating server for providing services and performing methods as described herein, in accordance with some embodiments.

FIG. 10 shows a coordinating server for providing services and performing methods as described herein, in accordance with some embodiments. Coordinating server 600 includes processor 1002 and memory 1004, which are configured to provide the functions described herein. Also present are radio access network coordination/routing (RAN Coordination and routing) module 1006, including ANR module 1006*a*, RAN configuration module 1008, and RAN proxying module 1010. The ANR module 1006*a* may perform the ANR tracking, PCI disambiguation, ECGI requesting, and GPS coalescing and tracking as described herein, in coordination with RAN coordination module 1006 (e.g., for requesting ECGIs, etc.). In some embodiments, coordinating server 1000 may coordinate multiple RANs using coordination module 1006. In some embodiments, coordination server may also provide proxying, routing virtualization and RAN virtualization, via modules 1010 and 1008. In some embodiments, a downstream network interface 1012 is provided for interfacing with the RANs, which may be a radio interface (e.g., LTE), and an upstream network interface 1014 is provided for interfacing with the core network, which may be either a radio interface (e.g., LTE) or a wired interface (e.g., Ethernet).

Coordinator 1000 includes local evolved packet core (EPC) module 1020, for authenticating users, storing and caching priority profile information, and performing other EPC-dependent functions when no backhaul link is available. Local EPC 1020 may include local HSS 1022, local MME 1024, local SGW 1026, and local PGW 1028, as well as other modules. Local EPC 1020 may incorporate these modules as software modules, processes, or containers. Local EPC 1020 may alternatively incorporate these modules as a small number of monolithic software processes. Modules 1006, 1008, 1010 and local EPC 1020 may each run on processor 1002 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A virtualizing and interworking gateway, comprising:

a virtual 4G core providing for 4G networks a plurality of virtualized 4G network functions;

a virtual 5G core providing for 5G networks a plurality of virtualized 5G network functions;

an interface to a core network;

an interface to a 4G Radio Access Network (RAN);

an interface to a 5G RAN; and an Interworking Function (IWF), the IWF including a shared IWF data store for 4G and 5G signaling, wherein the IWF interworks signaling between the 5G RAN and the core network by causing the shared IWF data store to emit data based on data received from the 5G RAN and interworked to 4G RAN parameters;

wherein inter-RAT handovers use the virtual 5G core to send information to a 4G evolved packet core (EPC); and wherein the virtualizing and interworking gateway provides interworking 4G to 5G such that the 5G RAN works with the 4G core.

2. The virtualizing and interworking gateway of claim 1, further comprising the shared IWF data store supporting the virtual 4G core and the virtual 5G core.

3. The virtualizing and interworking gateway of claim 1 wherein the IWF interworks signaling between the virtual 4G core and the virtual 5G core.

4. The virtualizing and interworking gateway of claim 1 wherein inter-Radio Access Technology (RAT) handovers use sideband information channels between the virtual 4G core and the virtual 5G core.

5. The virtualizing and interworking gateway of claim 4 wherein the inter-RAT handovers use a module defined between the virtualizing and interworking gateway and the 4G core to translate the inter-RAT handover to an intra-RAT handover.

6. A method for 4G and 5G core interworking, comprising:

providing a gateway, the gateway comprising: a virtual 4G core providing for 4G networks a plurality of virtualized 4G network functions, a virtual 5G core providing for 5G networks a plurality of virtualized 5G network functions, an interface to a core network, an interface to a 4G Radio Access Network (RAN), and an interface to a 5G RAN;

interworking, by the gateway, 4G to 5G such that a 5G RAN works with a 4G core;

interworking using an Interworking Function (IWF), the IWF including a shared IWF data store for 4G and 5G signaling;

interworking signaling between the 5G RAN and the core network by causing the shared IWF data store to emit data based on data received from the 5G RAN and interworked to 4G RAN parameters; and performing inter-RAT handovers using the virtual 5G core to send information to a 4G evolved packet core (EPC).

7. The method of claim 6, further comprising supporting, by a data store of the gateway, the virtual 4G core and the virtual 5G core.

8. The method of claim 6 further comprising interworking signaling between the virtual core virtual 4G core and virtual 5G core by an Interworking Function (IWF).

9. The method of claim 6 further comprising using sideband information channels for inter-Radio Access Technology (RAT) handovers between the virtual 4G core and the virtual 5G core.

10. The method of claim 9 further comprising using a module defined between the gateway and the 4G core to translate the inter-RAT handover to an intra-RAT handover.

11. The method of claim 9 further comprising using the virtual 5G core to send information to a 5G-aware 4G evolved packet core (EPC) for inter-RAT handovers.

12. A non-transitory computer-readable medium containing instructions for 4G and 5G core interworking, which, when executed, cause a telecommunications core network node to perform steps comprising:

providing a virtual 4G core providing for 4G networks a plurality of virtualized 4G network functions, a virtual 5G core providing for 5G networks a plurality of virtualized 5G network functions, an interface to a core network, an interface to a 4G Radio Access Network (RAN), and an interface to a 5G RAN;

interworking 4G to 5G such that a 5G RAN works with a 4G core;

interworking using an Interworking Function (IWF), the IWF including a shared IWF data store for 4G and 5G signaling;

interworking signaling between the 5G RAN and the core network by causing the shared IWF data store to emit data based on data received from the 5G RAN and interworked to 4G RAN parameters; and performing inter-RAT handovers using the virtual 5G core to send information to a 4G evolved packet core (EPC).

13. The computer-readable medium of claim 12, further comprising instructions for providing a data store supporting the virtual 4G core and the virtual 5G core.

14. The computer-readable medium of claim 12 further comprising instructions for interworking signaling between the virtual 4G core and the virtual 5G core.

15. The computer-readable medium of claim 12 further comprising instructions wherein inter-Radio Access Technology (RAT) handovers use sideband information channels between the virtual 4G core and the virtual 5G core.

16. The computer-readable medium of claim 15 further comprising instructions wherein the inter-RAT handovers use a module defined between the telecommunications core network node and the 4G core to translate the inter-RAT handover to an intra-RAT handover.

17. The computer-readable medium of claim 15 further comprising instructions wherein the inter-RAT handovers use the virtual 5G core network to send information to the 5G-aware 4G evolved packet core (EPC).

* * * * *